United States Patent Office 2,961,373
Patented Nov. 22, 1960

2,961,373

FUNGICIDAL AND BACTERICIDAL AGENT

William M. Boyer, Country Club Hills, Ill., assignor to The Richardson Company, Melrose Park, Ill., a corporation of Ohio No Drawing. Filed May 7, 1959, Ser. No. 811,520

7 Claims. (Cl. 167—31)

This invention relates to new and useful compositions adapted to prevent and control the growth of micro-organisms, such as fungus and bacteria. The present application is a continuation-in-part of patent application Serial No. 674,019, filed July 25, 1957, now abandoned.

At the present time, there are many compositions available on the market for preventing or controlling the growth of fungus or bacteria. Some of these compositions are metallic in nature in that they contain copper or mercury while others are organic in that they are derived from chlorinated organic compounds. While such compositions have, in general, been found effective, many of them have known disadvantages, thereby limiting their widespread use. Certain of these compounds are limited by reason of their high toxicity to humans and, accordingly, can only be used to treat articles or objects with which humans will not normally come in contact. Another disadvantage is that many of the chlorinated organic compounds are relatively expensive and, hence, their application must be one which is justified by the cost involved. In addition, numerous agents used to inhibit the growth of bacteria or fungus are of such a nature that they do not have an appreciable lasting effect by reason of the fact they can be readily leached or removed from an object to which they have been applied.

Accordingly, it is one of the objects of this invention to provide a new composition capable of preventing or inhibiting the growth of micro-organisms which is relatively inexpensive.

Another object is the provision of a fungicidal or bactericidal composition which has low toxicity toward humans.

A still further object is to provide compositions of the foregoing type which have a lasting effect when applied to a particular article or object.

These and other objects of the invention will become more apparent from the following specifications.

The new compositions which have been found to have the remarkable fungicidal or bactericidal properties are those which may be broadly identified as fusible, chlorine-containing, phenol-formaldehyde resinous condensation products. These compositions are formed by chlorinating a fusible, acid-catalyzed, chlorine-free, phenol-formaldehyde resinous condensation product, compositions of the latter type being commonly referred to as "novolaks." Novolaks are understood to contain a plurality of phenolic nuclei united by methylene groups forming both straight and branch chains in the same molecule. Such resins normally have an average molecular weight within the range of between slightly more than 200 to approximately 1300. They may be subsequently hardened by reaction with a methylene donating agent. The method of making the preferred chlorinated products contemplated herein and the products themselves have been disclosed and claimed in a copending application of Gilbert Gavlin and William M. Boyer, Serial No. 630,054, filed December 24, 1956, entitled "Resinous Compositions and Process."

As indicated in the aforementioned application, novolaks or fusible, phenol-formaldehyde condensation resins are formed by condensing a phenol with formaldehyde in a molar ratio of about 1 to 1 or higher, using an acid catalyst. The resultant condensation product is then subjected to chlorination by introducing chlorine, preferably as a gas, directly into a solvent solution of the novolak. The reaction has been found to proceed rapidly with the condensation product readily accepting the chlorine without using a catalyst. The degree of chlorination can be readily controlled so as to incorporate any amount of chlorination required. For example, the reaction can be controlled to give the equivalent of one or two chlorine atoms for each phenolic nuclei present in the novolak. The term "phenol," as used herein, is intended to include not only phenol but also cresol and xylenol as novolaks made from starting compounds of the latter type and formaldehyde are, likewise, quite susceptible of being chlorinated as is a straight phenol-formaldehyde condensation product.

Typical solvents that may be used for dissolving novolaks prior to chlorination are methanol, acetic acid, chloroform and 1-nitropropane, the latter solvent being preferred by reason of the fact that it has less affinity for hydrogen chloride which is produced during the chlorination and, therefore, permits an easier separation of the same from the solution.

An alternate procedure for chlorination involves fusing the novolak to a desired state of fluidity and then introducing chlorine into the fluidized resin without a solvent.

Further, as pointed out in the above mentioned application, the type of product formed by the chlorination of a fusible, phenol-formaldehyde resin is to be distinguished from a broadly similar composition which can be prepared by reacting a halogenated phenol with formaldehyde. Compositions of the latter type, among other things, do not readily form branch chain structures nor afford the opportunity to obtain a product having as high a degree of chlorination. Further, when reacting a halogenated phenol with formaldehyde to produce a halogenated product, it will be found that the reaction is relatively sluggish and slow for the reason that the presence of a halogen atom in the phenol ring tends to deactivate the ring relative to its reaction with formaldehyde.

Tests have been made to determine the effectiveness of the particular chlorinated novolaks contemplated by this invention with respect to preventing or inhibiting the growth of microorganisms, as well as comparison tests between these compositions and other chlorinated organic compositions known to be in use for the same purpose. The following data is presented as illustrating the effectiveness of chlorinated novolaks as compared with selected currently available compositions.

| Sample No. | Percent Cl | Micrococcus pyogenes var. aureus, mm. | Aspergillus niger | Trichophyton mentagrophytes, mm. | Chaetomium globosum, mm. |
| --- | --- | --- | --- | --- | --- |
| 21-245 | 38.7 | 13 | 28 mm | 45 | 45 |
| 41-108 | 53.6 | 17 | 25 mm | 45 | 45 |
| 41-112 | 23.5 | 5 | No Inhibition. | 11 | 11 |
| 41-113 | 53.0 | 5 | do | 1 | 6 |

The foregoing data was developed using the Agar Plate technique as described in the U.S. Department of Agriculture Circular No. 198 (1931). All numbers appearing under each test organism express the zone of inhibition in millimeters as determined by the test. Culture media upon which each of the test organisms were grown are as follows:

Micrococcus pyogenes var.
  aureus _____ F.D.A. agar, 35° C.
Aspergillus niger _____ Potato dextrose agar, 25° C.
Trichophyton mentagrophytes _____ Emmon's agar, 35° C.
Chaetomium globosum ____ Mixed salts agar+cellulose, 25° C.

Sample 21-245 was a chlorinated novolak made by first condensing phenol with formaldehyde in a molar ratio of 1.25 to 1 to give a resin having an average cryoscopic molecular weight of 393 followed by chlorinating in a methanol solution belows −66° C. Sample 41-108 was a chlorinated novolak made by initially condensing phenol with paraformaldehyde in a molar ratio of 1.6 to 1 resulting in a resin having an average cryoscopic molecular weight of 538, the resin then being chlorinated in a 1-nitropropane solution at room temperature. Samples 41-112 and 41-113 were compounds known to have fungicidal properties and were, respectively, 2,2'-dihydroxy-5,5'-dichloro-diphenylmethane and 2,2'-dihydroxy-3,3', 5,5', 6,6'-hexachlorodiphenylmethane. The foregoing data illustrates the larger effective areas of inhibition of chlorinated novolaks as compared to the selected known bactericidal and fungicidal agents when using the Agar Plate technique.

Chlorinated novolaks contemplated by this invention may be mixed or blended with any of the known carriers or extenders, such as clay, silica, wood and nut flour, and petrolatum or polyethylene glycol waxes. In addition, they may also be used with solvents, such as an alcohol-water solvent or formed as a constituent of either an oil-in-water emulsion or a water-in-oil emulsion. Further, they may be mixed with soaps, which in turn are cast into bars.

In this respect, it should be mentioned that the present compositions have been found to be markedly effective in the presence of soap solution which is not the case with some antiseptics, such as phenol. For example, one part of Sample 21-245 (above) was found to have a killing effect on micrococcus pyogenes var. aureous when mixed with 20,000 parts of a one percent soap solution. The particular organism tested is a well-known skin bacteria.

The chlorinated compositions of the present invention may also be incorporated into coating materials, such as varnishes, paints and the like. Various articles, such as fabric, ropes, tenting, etc. may be impregnated with these novel compositions. As previously indicated, the present compositions, being resinous in form and having a relatively large molecular structure, will be found to have a greater capacity for retention by an object to which they are applied, therby preventing premature leaching or dissolving by water or other solvent-acting agents within a relatively short time. As a bactericidal or fungicidal agent, these new compositions may be used in amounts of less than one percent with a carrier, determined on a weight basis.

The foregoing disclosure has emphasized the use as a preferred agent of chlorinated novolaks made by chlorinating a previously prepared, unhalogenated novolak. By way of comparison, it has also been found that fusible, phenol-formaldehyde condensation products made from a halogenated phenol have some ability for inhibiting the growth of micro-organisms, although not to the extent of the preferred compositions. For example, a chlorinated novolak prepared from parachlorophenol and paraformaldehyde, having an average cryoscopic molecular weight of 457, was found to have a zone of inhibition of 5 mm. when tested by the Agar Plate technique against micrococcus pyogenes var. aureus.

Having described the invention and certain exemplary embodiments thereof, the same is only intended to be limited by the scope of the following claims.

I claim:

1. The method of inhibiting the growth of micro-organisms which comprises subjecting such micro-organisms to the action of a chlorinated composition obtained by reacting chlorine in a gaseous state with a permanently fusible, acid-catalyzed, resinous condensation product of formaldehyde and a chlorine-free member of the class consisting of phenol, cresols and xylenols and having an average molecular weight within the range of between 200 to approximately 1300, said chlorinated composition having the equivalent of at least one chlorine atom for at least one phenolic nucleus of said condensation product.

2. The method of preventing the growth of micro-organisms which comprises applying in the environment of the micro-organisms, a chlorinated composition obtained by reacting chlorine in a gaseous state with a permanently fusible, acid-catalyzed, resinous condensation product of formaldehyde and a chlorine-free member of the class consisting of phenol, cresols and xylenols and having an average molecular weight within the range of between 200 to approximately 1300, said chlorinated composition having the equivalent of at least one chlorine atom for at least one phenolic nucleus of said resin.

3. The method of preventing the growth of fungi on an object subject to attack by fungi which comprises applying to said object a fungistatic to fungicidal amount of a chlorinated composition obtained by reacting chlorine in a gaseous state with a permanently fusible, acid-catalyzed, resinous condensation product of formaldehyde and a chlorine-free member of the class consisting of phenol, cresols, and xylenols and having an average molecular weight within the range of between 200 to approximately 1300, said chlorinated composition having the equivalent of at least one chlorine atom for at least one phenolic nucleus of said condensation product.

4. An article of manufacture treated with a chlorinated composition obtained by reacting chlorine in a gaseous state with a permanently fusible, acid-catalyzed, resinous condensation product of formaldehyde and a chlorine-free member of the class consisting of phenol, cresols and xylenols and having an average molecular weight within the range of between 200 to approximately 1300, said chlorinated composition having the equivalent of at least one chlorine atom for at least one phenolic nucleus of said condensation product, whereby said article is rendered resistant to attack by fungi.

5. A fabric impregnated with a chlorinated composition obtained by reacting chlorine in a gaseous state with a permanently fusible, acid-catalyzed, resinous condensation product of formaldehyde and a chlorine-free member of the class consisting of phenol, cresols and xylenols and having an average molecular weight within the range of between 200 to approximately 1300, said chlorinated composition having the equivalent of at least one chlorine atom for at least one phenolic nucleus of said condensation product, whereby said fabric is rendered resistant to attack by fungi.

6. The method of inhibiting the growth of microorganisms which comprises subjecting such organisms to the action of a chlorinated composition obtained by reacting chlorine gas with a permanently fusible, acid-catalyzed, resinous condensation product of formaldehyde and chlorine-free phenol having an average molecular weight within the range of between 200 to approximately 1300, said chlorinated composition having the equivalent of at least one chlorine atom for at least one phenolic nucleus of said condensation product.

7. The method of claim 6 wherein said chlorinated composition contains a minimum of about thirty-eight percent by weight of chlorine.

References Cited in the file of this patent

UNITED STATES PATENTS

| | | |
|---|---|---|
| 2,759,903 | Epstein et al. | Aug. 21, 1956 |
| 2,783,279 | Chiddix | Feb. 26, 1957 |

FOREIGN PATENTS

| | | |
|---|---|---|
| 429,377 | Italy | Jan. 24, 1948 |